H. ALBRECHT.
HOLDERS FOR CHRISTMAS TREES.
No. 183,100. Patented Oct. 10, 1876.
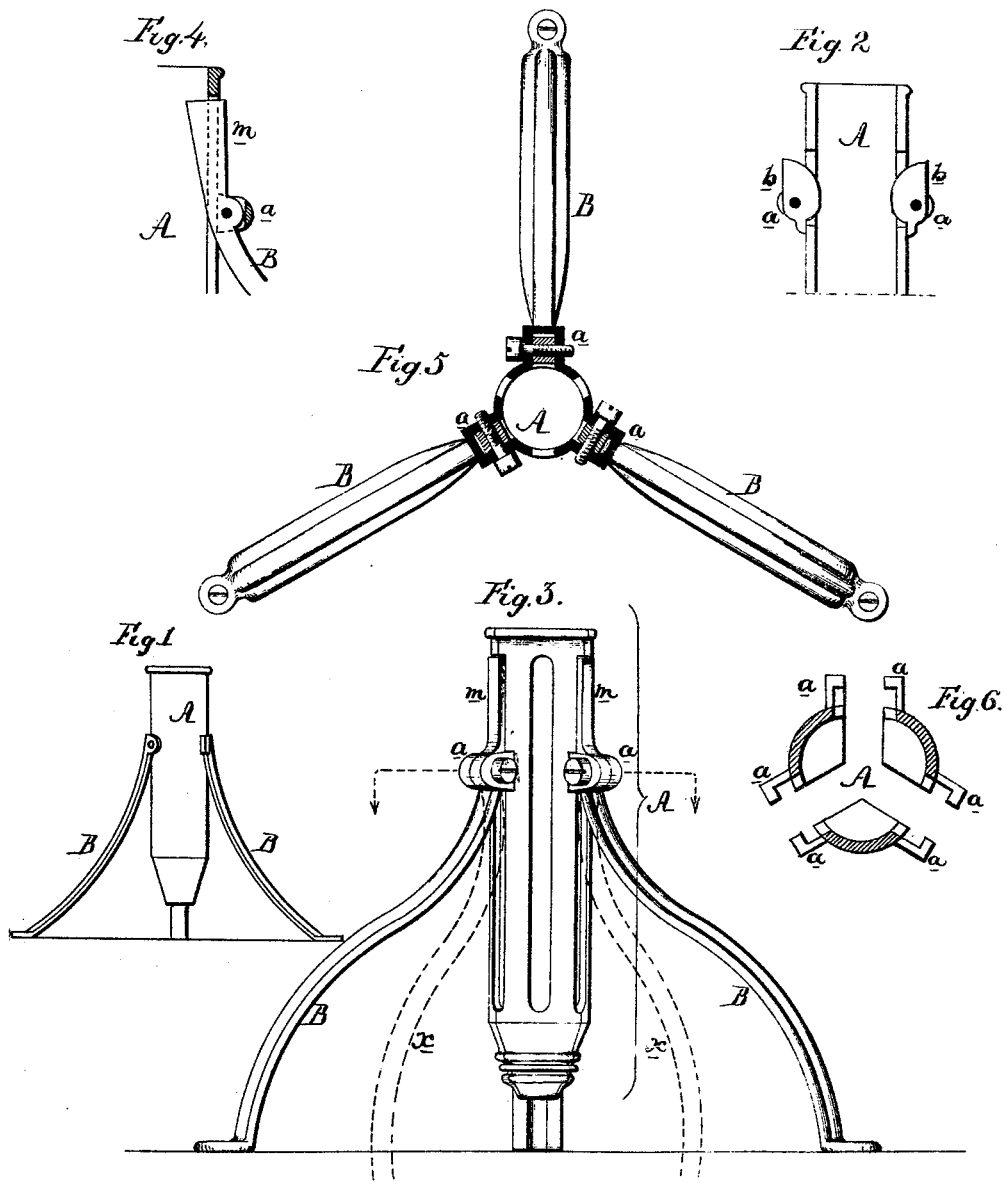
Witnesses
Charles Howson
Henry Howson Jr
Hermann Albrecht
by his Attorneys
Howson and Son
JAMES R. OSGOOD & CO BOSTON

UNITED STATES PATENT OFFICE.

HERMANN ALBRECHT, OF PHILADELPHIA, PENNSYLVANIA, ASSIGNOR TO HIMSELF, E. A. CORBIN, AND A. C. MOTT, OF SAME PLACE.

IMPROVEMENT IN HOLDERS FOR CHRISTMAS-TREES.

Specification forming part of Letters Patent No. 183,100, dated October 10, 1876; application filed August 24, 1876.

*To all whom it may concern:*

Be it known that I, HERMANN ALBRECHT, of Philadelphia, Pennsylvania, have invented an Improved Holder for Christmas-Trees, &c., of which the following is a specification:

The object of my invention is to construct a cheap support for holding and steadily retaining the stem of a Christmas-tree or other like object.

In the accompanying drawing, Figure 1 illustrates my support in its simplest form; Fig. 2, a sectional view of the socket with griping-cams; Fig. 3, an exterior view of the support made with griping devices forming parts of hinged legs; Fig. 4, a sectional view of part of Fig. 3; Fig. 5, a plan view of Fig. 3; and Fig. 6, a sectional plan of the socket, showing the mode in which I prefer to make the same.

In Fig. 1 the support consists simply of a socket, A, combined with legs B, preferably three in number, which may be permanently secured to the socket in different ways.

The feet of the legs B may be screwed to the floor, or to a box, barrel, or other object, when it is ready to receive the stem of a Christmas-tree, the lower end of the stem resting in and being steadied by the lower end of the socket, while the stem may be steadied above, if necessary, by wedges driven between the socket and stem.

On the score of economy, I prefer to make the socket A in three parts, as shown in the sectional plan view, Fig. 6, each part being cast with two lugs, $a\ a$, and the several parts being secured together, near their upper end, by screws or rivets passing through the said lugs, and below by a wire wrapped round the tapering lower end of the socket, as shown in Fig. 3, or by any other suitable fastening.

It will be evident to those familiar with molding and casting operations that it is much more economical to thus make the socket in three parts than in one. The plan, however, presents this further advantage, that the lugs afford ready mediums through which the three legs may be secured to the socket.

Cams $b$ may be hinged to lugs between the sections of the socket, as shown in Fig. 2, so that if the stem of the tree is smaller than the socket the cams may be turned down and made to gripe the stem from three points, thereby steadying the stem above by the cams, while it is steadied below by the tapering end of the socket.

In Figs. 3, 4, and 5, the legs B are hinged to the lugs $a$ of the socket, so that the supports may be packed into small compass for transportation, the legs being moved outward before the feet are secured to the floor or other object. When the legs B are thus hinged to the lugs $a$ of the socket, I prefer to make each leg with an upper arm, $m$, as best observed in Fig. 4.

When the support thus constructed is held up, the legs will assume the position shown by dotted lines $x\ x$, and the upper arms $m$ will be withdrawn from the slots in the socket. The stem of the tree being now introduced into the said socket, the legs are spread outward, so that they will perform the duty of levers, the short arms $m$ of which are forced against the stem of the tree, which is thus griped from three points, the short arms $m$ of the legs performing the same duty as the griping-cams $b$.

I claim as my invention—

1. The within-described support, consisting of the socket A, combined with legs B, connected to the sides of the said socket above its lower end, substantially as described.

2. The combination of the socket A, having a tapering lower end, with a griping device near its upper end, substantially as specified.

3. The combination of the socket A with legs B, hinged to the same, as set forth, for the purpose specified.

4. The combination of the socket A, legs B, hinged to the socket, and griping-arms $m$, each of which forms part of one of the legs, all substantially as described.

5. The combination of the socket, made in three or more parts, each part having lugs $a\ a$, with legs B, hinged to the lugs by the same rivets or screws which aid in connecting the several parts of the socket together, as set forth.

In testimony whereof I have signed my name to this specification in the presence of two subscribing witnesses.

HERMANN ALBRECHT.

Witnesses:
HENRY HOWSON, Jr.,
HUBERT HOWSON.